Figure 1:
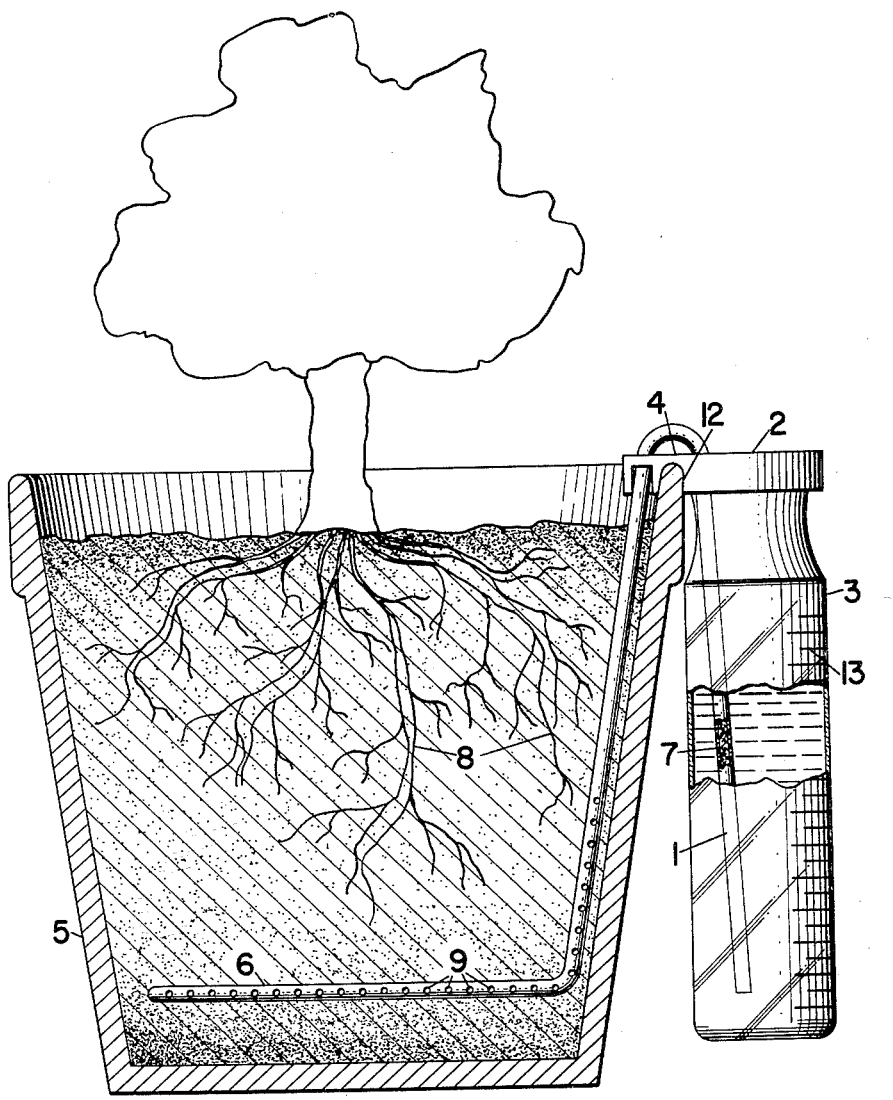

Dec. 25, 1962     B. T. WALL     3,069,807
DEVICE FOR WATERING AND FEEDING PLANTS, FLOWERS AND THE LIKE
Filed March 30, 1959

INVENTOR
BYRON T. WALL

BY George H. Mortimer
ATTORNEY 3,069,807
DEVICE FOR WATERING AND FEEDING PLANTS,
FLOWERS AND THE LIKE
Byron T. Wall, 143—20 Franklin Ave., Flushing 55, N.Y.
Filed Mar. 30, 1959, Ser. No. 802,995
2 Claims. (Cl. 47—38)

This invention relates to a device for watering and feeding plants by a capillary or combined capillary and siphon system. It permits one to observe more carefully the amount of water and liquid plant food consumed, and to more carefully measure it. It also permits extended watering of plants during vacations or absences. It permits the feeding and the watering of plants in such a way as to encourage deeper rooting, and where, as in the case of certain plants, better results are obtained by avoiding surface watering. It reduces stem scalding and other damage which is often caused by repeated surface watering, and at the same time feeds and waters to the demands of the plant, slowing when the demand is light and speeding up when the demand increases.

Figure 2:
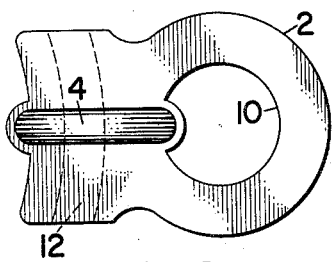

The construction will be described in conjunction with the drawing in which:

FIG. 1 is a side view, partly in section, of the device attached to a flower pot; and FIG. 2 is a top view of the tube holder and lid on a larger scale.

Essentially this device consists of a tube or tubes 1 of plastic material having a first portion to be submerged in a container 3 for the holding of liquid and a second portion to be buried in the soil in a flower pot 5 or the like, said tube for a distance approximately equal to the depth of the container and to approximately an equal depth over and into the flower pot being imperforate and forming a sheath for a suitable material 7 which sustains a capillary action. This material extends through the tube at least for the distance where it is imporforate and preferably throughout the entire length of the tube. From this point, i.e., from the point in the second portion at about the level of the end of the tube in the container, the tube has perforations 9 and the tube is sufficiently long to permit it to be buried in the soil as desired in a manner as to distribute the liquid in the most advantageous or suitable location. By filling the tube completely with water, excluding all air, it forms a combined capillary and restricted siphon. Where greater flow is desired than would be provided by capillary action alone this becomes an advantage—with the added safety feature that if the siphon action is broken the capillary action is maintained. Where it is desired to provide water for plants over extended periods of time larger containers may be provided or plants may be placed around one large container with the capillary tubes extending into a common liquid supply. Liquid or soluble plant foods may be added and will quickly reach the plant roots.

The preferred embodiment of my device shown in FIG. 1 depicts the tube 1 extending from a point near the bottom of the container 3 upwardly to a tube holder 2 which also serves as the lid for the container 3 located thereunder, around an arcuate support 4 and downwardly into the soil in the flower pot to a point near the bottom from whence it extends transversely. The transverse portion 6 may have any desired configuration, so as to distribute the liquid to the soil to be absorbed by the roots of the plant indicated at 8. The lid 2 preferably is provided with an opening 10 for easy replenishment of liquid. The lid has means of any desired nature for securing the container 3 thereto on the underside thereof and for holding it outside the pot 5. Conveniently the holder is provided with a downwardly opening channel 12 which is adapted to receive the rim of the pot, thereby holding the device in place. The container preferably is sufficiently transparent to enable one to observe the amount of liquid consumed, as stated above, and to measure this amount calibrations 13 may be provided on the container. The perforations 9 in the tube permit the liquid to flow as required throughout the root area as it is supplied to the perforated portion by siphon and/or capillary action. The use of the tubing prevents the pressure of the soil from compressing the capillary material 7 and thereby restricting the flow of the liquid therethrough, yet permitting the soil to contact the capillary material through the perforations 9 in the tubing, and it provides a controlled channel which may be arranged to suit any shape of plant container.

While the above description or specification outlines a device by which a combination siphon-capillary system for plant feeding may be made to operate, it is apparent that many variations may be made without departing from the spirit of this invention or limiting the confines of its use.

Having described my invention, what I claim to be new and useful is:

1. A device for supplying liquid by siphon and capillary action to a plant growing in soil in a pot from a liquid container outside the pot comprising a tube holder having a downwardly opening channel adapted to receive the rim of the pot, a tube held by said holder with a first portion adapted to extend from the holder near to the bottom of a container located under said holder outside the pot and with a second portion adapted to extend a substantial distance into the soil in the pot, said tube being imperforate from an opening in the end of said first portion at least to a position in said second portion below the surface of the soil in the pot and having a plurality of perforations therebeyond whereby siphon flow of liquid from a container in which the end of said first portion is immersed into the soil through said perforations can be caused whenever the level of said liquid is above the uppermost perforation, and material in said tube adapted to cause liquid from a container in which the end of the first portion is immersed to flow into the soil through said perforations by capillary action.

2. A device for supplying liquid by siphon and capillary action to a plant growing in soil in a pot comprising a lid having adjacent to one side a downwardly opening channel adapted to receive the rim of the pot, means on said lid for securing to the underside thereof outside the pot a container, a container secured to the underside of said lid, a tube extending from a first end near the bottom of the container through the lid to a second end adapted to be buried a substantial distance in the soil in the pot, said tube being imperforate from an opening in said first end at least to a position below the surface of the soil in the pot and having a plurality of perforations therebeyond whereby siphon flow of liquid from said container into the soil can be caused whenever the level of liquid in the container is above the uppermost perforation, and material in said tube adapted to cause liquid from said container to flow into the soil by capillary action whenever the material is in contact with liquid in said container.

References Cited in the file of this patent

UNITED STATES PATENTS

| 880,968 | Bunker | Mar. 3, 1908 |
| 1,400,628 | Rudolph | Dec. 20, 1921 |

FOREIGN PATENTS

| 63,335 | France | Apr. 30, 1955 |
| | Add'n to No. 1,061,015 | |
| 1,061,015 | France | Nov. 25, 1953 |
| 619,535 | Germany | Oct. 3, 1935 |
| 180,967 | Great Britain | June 8, 1922 |